United States Patent [19]

Fuentes et al.

[11] Patent Number: 4,805,339
[45] Date of Patent: Feb. 21, 1989

[54] SONIC FISHING LURE

[75] Inventors: Gabriel S. F. Fuentes, Buenos Aires, Argentina; Orlando L. Hidalgo, Miami, Fla.

[73] Assignee: TANI Enterprises, Inc., Miami, Fla.

[21] Appl. No.: 133,498

[22] Filed: Dec. 16, 1987

[51] Int. Cl.⁴ .............................................. A01K 85/00
[52] U.S. Cl. ............................... 43/42.31; 43/17.1
[58] Field of Search ........................ 43/17.1, 42.31; 340/394, 393, 384 E, 388

[56] References Cited

U.S. PATENT DOCUMENTS

| | | | |
|---|---|---|---|
| 2,577,229 | 12/1951 | Carnes | 177/7 |
| 2,757,475 | 8/1956 | Pankove | 43/17.1 |
| 2,784,399 | 3/1957 | Smith | 43/17.1 |
| 2,920,318 | 1/1960 | Balcken | 43/17.1 |
| 2,932,110 | 4/1960 | Kilpinen et al. | 43/17.1 |
| 2,977,705 | 4/1961 | Busnel | 43/17.1 |
| 3,120,073 | 2/1964 | Brunton | 43/17.1 |
| 3,414,873 | 12/1968 | Richard | 43/17.1 |
| 3,416,254 | 12/1968 | Bornzin | 43/17.1 |
| 3,683,356 | 8/1972 | D'Amore | 43/17.1 |
| 4,223,467 | 9/1980 | Hodges, Jr. et al. | 43/42.31 |
| 4,380,132 | 4/1983 | Atkinson | 43/42.31 |
| 4,583,313 | 4/1986 | Dugan | 43/17.1 |
| 4,625,446 | 12/1986 | Morimoto | 43/17.1 |
| 4,625,447 | 12/1986 | Buchanan | 43/17.1 |

FOREIGN PATENT DOCUMENTS 1159565 12/1963 Fed. Rep. of Germany ....... 43/17.1

Primary Examiner—Kurt Rowan
Attorney, Agent, or Firm—Richard M. Saccocio

[57] ABSTRACT

A new and improved sonic fishing lure is disclosed. An energy source, an electrical circuit, and a sonic transducer are each respectively contained within chambers of a generally hollow cylindrically-shaped fishing lure. Due to the construction of the fishing lure, the sound output from the fishing lure is of a greater intensity and is produced for a longer period of time than that of prior art devices. The sound output from a coil activator vibrating plate type of transducer is enhanced by the addition of a second vibrating plate. A fluid connection between the outer surface of the sound transducer and the body of the fishing lure further enhances and intensifies the sound output by the fishing lure.

7 Claims, 2 Drawing Sheets

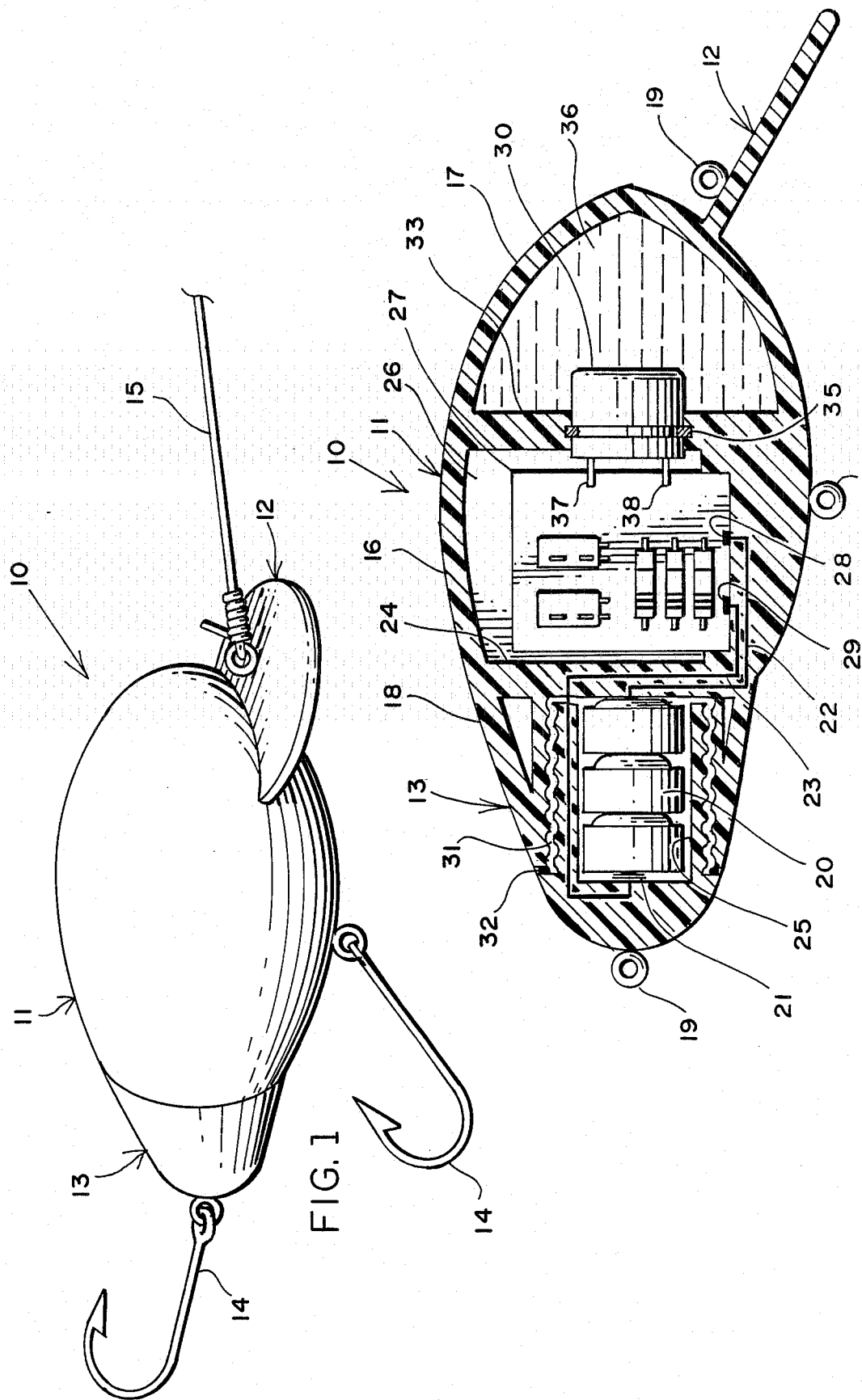

SONIC FISHING LURE

BACKGROUND OF THE INVENTION

1. Field of the Invention

This invention pertains in general to fishing lures and in particular to fishing lures of the type which emit a sound which attracts fish to the lure which are then caught by the fish attempting to swallow the lure.

2. Description of the Prior Art

A fish is a red-blooded, gill-breathing aquatic animal, which is believed to be the oldest of the vertebrates. The majority of fresh water and marine fish belong to the ray-fin group, the Teleost, which range from the more primitive herring and their relatives to the highly-developed perch and their allies. It is generally accepted that fish are able to detect or "hear" as well as generate or produce sounds and other mechanical disturbances within their water environment. Most fish have a sensitive lateral line on each side of their body that responds to pressure waves in the water. In some of the fish the air float or air bladder is a supplementary respiratory organ and in others it aids in hearing and may also be used to produce sounds by acting as a vibrator and resonator. The sensory mechanism by which fish detect mechanical disturbances and the functional relationship of the sensitive lateral line and the internal auditory apparatus will be briefly reviewed.

Fish do not hear sound but rather feel vibrations which are transmitted through the water to the sensitive lateral lines on the sides of their body. Mechanical vibrations or sounds cause the entire fish to vibrate. The vibrations are transmitted through the sensitive lateral lines of the fish into an inner ear mechanism. As is the case with all vertebrates, the receptor element in the ear of the fish are hair cells which are connected to cranial nerves. The sensory hair cells in fish are all of the cylindrical form. Very similar cells are present in the equilibratory portion of the ear and in a lateral line where they detect mechanical disturbances such as the small wave made by an insect that has fallen into the water. In each case nerve impulses are triggered by bending of the hairs. In the auditory part of the ear the hairs are imbedded in the tiny gelatinous mass that contains loosely-suspended tiny stones (otolith), while the body of the hair cell is part of the wall of the otolith chamber. When wave sounds impact on a fish, they cause minute vibrations of the whole animal and with it the otolith chamber wall. Since the otolith is floating, however, it moves slowly and with less amplitude than the initiating vibrations. This results in a shearing action on the hairs and thereby generates nerve impulses which are felt by the fish. Most fish do not have any amplifying structure comparable to the ear drum and the middle ear ossicles of mammals. However, in nearly one-third of the fish, the air bladder acts as a drum which, as mentioned above, aids in a fish's hearing and may be used to produce sounds by acting as a vibrator and a resonator.

Most fish of the Teleost species are predators in the sense that they survive by eating other living animals which, most often, are small fish. The auditory capabilities of such fish is very beneficial to their life cycle, in that they can hear the sounds of struggling, frenzied or feeding fish upon which they prey. Such sounds are particularly attractive to predator fish which include but are not limited to grouper, snapper, trout, dolphin, bluefish, and other like fishes which are considered good eating by humans. It is also known that members of the Elasmo group which include other predators such as sharks, are also attracted by the struggling or feeding sounds of other fish. Moreover, recent studies have shown that the auditory mechanism of predator fish are particularly sensitive to low frequency sounds between the range of fifty-to-three hundred (50 to 300) Hertz and that the sounds produced by struggling frenzied or feeding fish are within this frequency range. The present invention, in accordance with the above, utilizes the sensitivity of fish to low frequency sounds by attracting such fish having the capability to "hear" these sounds. The fish are caught with lures which produce the low frequency sounds which imitate the frenzied sounds of fish in distress or fish feeding.

In the prior art a number of United States patents have utilized sounds produced by various means in order to attract fish to the lure and thereby aid in catching the same. Typical of these United States patents are: "Audible Fish Lure," U.S. Pat. No. 2,577,229; "Sound Producing Fish and Game Lure," U.S. Pat. No. 2,757,475; "Sound Producing Fish Lure," U.S. Pat. No. 2,784,399; "Fish Lure," U.S. Pat. No. 2,932,110; "Fish Lure," U.S. Pat. No. 3,120,073; "Sonic Fishing Lure," U.S. Pat. No. 3,416,254; and "Vibrating Fish Lure," U.S. Pat. No. 4,223,467. While all of these patents disclose fishing lures which emit sounds, they are typically deficient in that they fail to achieve a sonic fishing lure which combines all of the necessary elements of a successful fishing lure. For example, it is necessary that the lure be of a sufficiently small size to allow catching fish in the range of approximately five-to-ten pounds which is the range of most members of the Teleost species. Further, it is necessary to produce a sound of sufficient magnitude to attract such fish from relatively large distances. Then too, a successful sonic fishing lure produces sound in a frequency range which is attractive to fish. A further deficiency apparent in the prior art is the inability of the prior art fishing lures to produce a sufficiently loud sound and yet not consume an inordinate amount of energy so that the lure may be used for relatively long periods of time without the need to replace the energy source.

Accordingly, a primary object of the present invention is to provide a sonic fishing lure which is small in size but yet produces a sound which is attractive to fish at a reasonably loud level so as to travel in water over relatively large distances and yet consume a relatively small amount of energy so as to have a relatively long operating lifetime.

Another object of the present invention is to provide a sonic fishing lure which produces reasonably loud sound at the relatively low frequency range of between fifty and three hundred (50 and 300) Hertz.

Another object of the present invention is to provide new and improved vibration means for producing an intensified level of sound within the body of a fishing lure in order to produce an external sound having a sufficient intensity to travel over relatively long distances.

Yet another object of the present invention is to provide new and improved means for efficiently transmitting sounds produced internal of a fishing lure, through the walls thereof and into the water surrounding the same.

A still further object of the present invention is to provide a sonic fishing lure which may be used at great water depths, at the surface of the water, or at any location therebetween so as to attract any of the various types of predator fish which normally inhabit the water at the various levels.

The above-stated objects as well as other implied objects, are accomplished by the present invention and will become apparent from the hereinafter set forth Summary of the Invention, Detailed Description of the Invention, Drawings, and the claims appended herewith.

SUMMARY OF THE INVENTION

The above-stated objects as well as other objects which although not specifically stated, but are intended to be included within the scope of the present invention, are accomplished by the present invention which comprises a fishing lure of the sonic variety which produces a sound at a frequency level which is attractive to a large majority of the edible and sporting predator fish of the Teleost and Elasmo species.

An electronic circuit is provided within the body of a fishing lure which includes a DC voltage source and a first astable multivibrator which produces an output signal of approximately one (1) Hertz. This output is sent to another astable multivibrator which outputs a pulsed signal of approximately one hundred (100) Hertz. The multivibrator circuit parameters are selected such that the output signal grouping of approximately one hundred (100) Hertz is pulsed with approximately a 200 millisecond interval between each output signal grouping. The pulsed output of the electronic circuit is input into an improved sonic transducer which comprises coil activated vibrating plates. The level of the sound output from the improved sound transducer achieves high volumes due to a pair of vibrating plates which are joined together by a flexible axial rod between the plates. The plate portion of the sound transducer is located within a fluid filled chamber contained within one end of the body of the fishing lure. Thus, in the invention the sound from the sonic transducer is coupled to the body of the fishing lure by the fluid interposed therebetween and in contact therewith. The sound produced is then transmitted into the water, within which the fishing lure is located, by the direct coupling of the water external to and in contact with the body of the fishing lure. In the manner provided, the power required or consumed to produce sound of sufficient intensity is held to a minimum due to the emission of sound from the sonic transducer to the water surrounding the lure being accomplished at a high rate of efficiency.

Standard fishing hooks may be attached to various points or locations on the outside of the body of the fishing lure in a normal manner. Also, the front of the fishing lure is provided with an eyelet to allow the attachment of a fishing line thereto.

Various other objects, advantages and features of the invention will become apparent to those skilled in the art from the following discussion taken in conjunction with the following drawings, in which:

BRIEF DESCRIPTION OF THE DRAWINGS

FIG. 1 is an overall isometric view of the sonic fishing lure as provided by the present invention;

FIG. 2 is a plan view of an axial cross-section through the fishing lure of FIG. 1;

DESCRIPTION OF THE PREFERRED EMBODIMENTS

Figure 3:
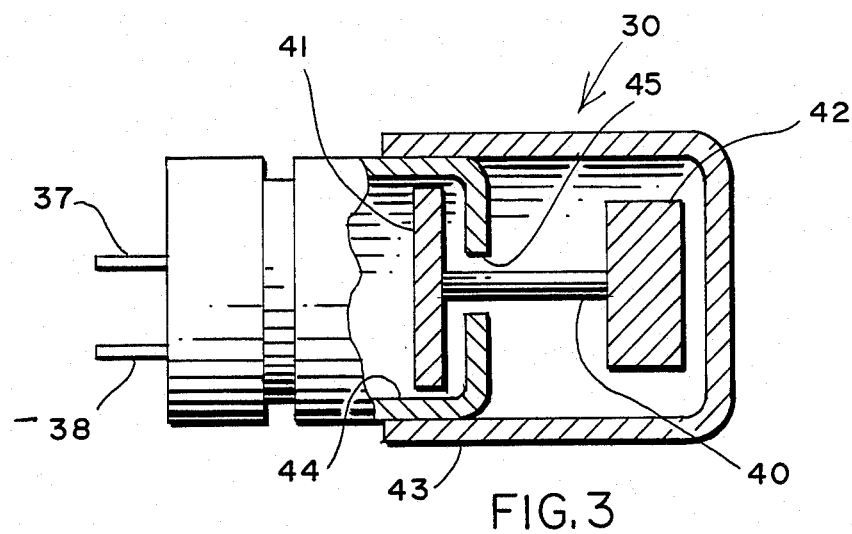
FIG. 3 is cross-sectional plan view of the sonic transducer as provided by the present invention.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings wherein like characteristics and features of the present invention shown in the various figures are designated by the same reference numerals.

FIG. 1 depicts a perspective view of the inventive sonic fishing lure 10 which includes a main body portion 11, a nose portion 12, and a tail portion 13. The overall shape of the sonic fishing lure 10 is not necessarily critical to the operation of the invention and may, therefore, comprise any of the well-known shapes that a conventional deep-water, mid-water, or surface-water fishing lure has in the past assumed. However, the overall shape depicted in FIG. 1 is that of a tested and proven streamlined configuration which easily cuts through water and because of its downward extending head portion maintains a substantially constant level within the water. It is important that the outside shell of the sonic fishing lure 10 be hermetically sealed so as to protect the internal components thereof from the adverse effects of the water environment within which the sonic fishing lure 10 is used. Typical fishing hooks 14 may be connected to any convenient location on the body of the sonic fishing lure 10. In the illustrated example one fishing hook is placed at eye 19 at the tail portion 13 while a second fishing hook is placed at eye 19 at the mid-bottom portion of the center portion 11 of sonic fishing lure 10. Similarly, the fishing line 15 may be appropriately connected to the eye 19 at the front or nose piece 12 of the sonic fishing lure 10.

FIG. 2 is a cross-sectional plan view of the inventive sonic fishing lure 10 illustrating one arrangement of the layout of the internal components. The main body 11 of the inventive sonic fishing lure 10 may be considered to comprise three parts, the mid-body portion 16, the front body portion 17 and the back body portion 18. Each portion is, of course, contiguous with the other portions and together form a generally one-piece main body 11. A first wall 24 separating back portion 18 from midportion 16 together with a hollow tail cap 38 forms a battery chamber 25. As illustrated in FIG. 2 of the drawings, cap 38 is threadingly connected 31 to back body portion 18. A seal such as an O-ring seal 32 is used to seal the connection between cap 38 and back body portion 18. In this manner battery chamber 25 comprises a water-proof hollow chamber.

Within chamber 25, are located three series connected DC batteries 20 of, for example, 1.5 volts each which together yield a total output of 4.5 volts. Each battery 20 may typically comprise a hearing aid battery, such as a type 675, for sonic fishing lures having an overall size of approximately two-to-four inches. For larger larger sonic fishing lures, a greater number of larger and more powerful batteries may be utilized.

The negative connection 21 of the series connected batteries 20 may be accomplished in any conventional manner such as by a metallic spring imbedded in a bored out top portion of cap 38 and by which when cap 38 is screwed into sealing contact with back body portion 18, an electrical contact is made with the negative end of the stack of batteries 20. Similarly, a positive electrical connection 34 may be made by a protruding contact imbedded within wall 24 which wall is located between front 17 and mid 16 body portions of fishing lure 10. Electrical wires 22 and 23 connect the positive and negative connections 34 and 21 to batteries 20 with the electrical circuitry of the sonic fishing lure 10 at connections 28 and 29 within an electrical circuit chamber 26. Wires 22 and 23 may be imbedded, respectively, within cap 38 and mid-body portion 16 during the process of manufacturing the respective components. Or, may comprise insulated wires passing through an opening in wall 24. Such technology is well known and need not be repeated within this specification.

Within the electrical circuit chamber 26, which is also a sealed air-tight chamber, is located an electronic circuit mounting board 27. Circuit board 27 may comprise a PC board to which is mounted the various electronic components of the circuitry as more fully explained hereinafter. The output of the electric circuit is input into a sonic transducer 30 which outputs the sound which is attractive to fish.

Sonic transducer 30 is mounted, in the example shown, within a wall 33 connecting the front body portion 18 to the mid-body portion 16 of the sonic fishing lure 10. A seal 35 surrounds the cylindrical body of sonic transducer 30 so as to form a fluid tight seal between a sonic chamber 36 and the mid-body body or electrical circuit chamber 26. Seal 35 may simultaneously fit within grooves in the cylindrical body of sonic transducer 30 and in a circular cutout within wall 33 to form a good seal and aid in maintaining the fixed position of transducer 30. Connections 37 and 38 of sonic transducer 30 may be used to connect the output signal from the electric circuit of the sonic fishing lure 10 to sonic transducer 30.

Sonic chamber 34 is completely filled with a fluid such as distilled water and is, therefore, in fluid contact with the exterior surface of sonic transducer 30 and the interior surface of sonic chamber 34. The sound output from sonic transducer 30 is, therefore, fluid coupled between sonic transducer 30 and the fluid within chamber 34 and also fluid coupled to the walls of chamber 34 by the fluid contained therin. This fluid coupling provides for an efficient transmittal of sound from the interior of sonic fishing lure 10 to the water surrounding the same by another fluid coupling comprising the contact of the water within which the sonic fishing lure 10 is to be used and the outer skin of primarily the tail portion 18 of sonic fishing lure 10.

Sonic transducer 30 is shown in cross section in FIG. 3 of the drawings. Sonic transducer 30 may be of a type comprising a vibrating plate which is activated by an electrical coil. Accordingly, sonic transducer 30 may, for example, comprise a QMB-111 series transducer manufactured by *Star Incorporated*, but as modified as hereinafter described. An axial shaft 40 is fixedly connected to and perpendicular with the center portion of the disk 41 within sonic transducer 30. The other end of rod or shaft 40 is fixedly connected to a second disk 42 in a manner similar to the connection to disk 41. The effect of combination of disks 41 and 42 as coupled by and separated by shaft or rod 40 is to increase significantly (approximately three times more) the sound output from a standard sonic transducer. Cap 43 is used to cover disk 42 and is sealingly connected to cap 44. Disk 42 may comprise a vibrating mass having a diameter of approximately three-quarters of the size of the diameter of disk 41 but a thickness of more than twice that of disk 41. The length of rod 40 may approximately be equal to the diameter of disk 42. Cap 43 is addition to providing a waterproof connection to the main body of sonic transducer 30 also acts as a sonic resonant chamber. Disk 42 and shaft 40 may be made from a material such as ordinary carbon steel having a diameter of 12 millimeters and a thickness of 1.5 millimeters, while shaft 40 may be made from piano wire having a thickness of 2 millimeters and a length of 7 millimeters. The flexibility of shaft 40 allows disk 42 to hit the sides of cap 43 to further increase the sound output from transducer 30. Test measurements have verified that a sonic transducer of the type disclosed and described herein results in an increase of the standard output of a QMB-111 transducer from eighty (80) decibels at ten (10) centimeters to over two hundred (200) decibels at ten (10) centimeters in the air. Underwater tests have verified the increased output of the modified sonic transducer 30 as well as the effectiveness of the sonic coupling aspects of the inventive fishing lure 10.

Figure 4:
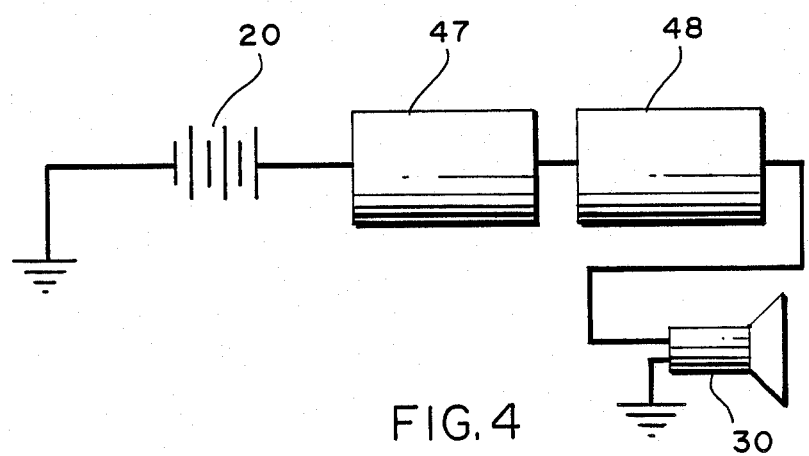
FIG. 4 is a schematic block diagram of the electronic circuitry of the fishing lure of FIG. 1; and, FIG. 5 is a typical schematic curve illustrating the pulse sonic output of the electronic circuitry of FIG. 4.
Figure 5:
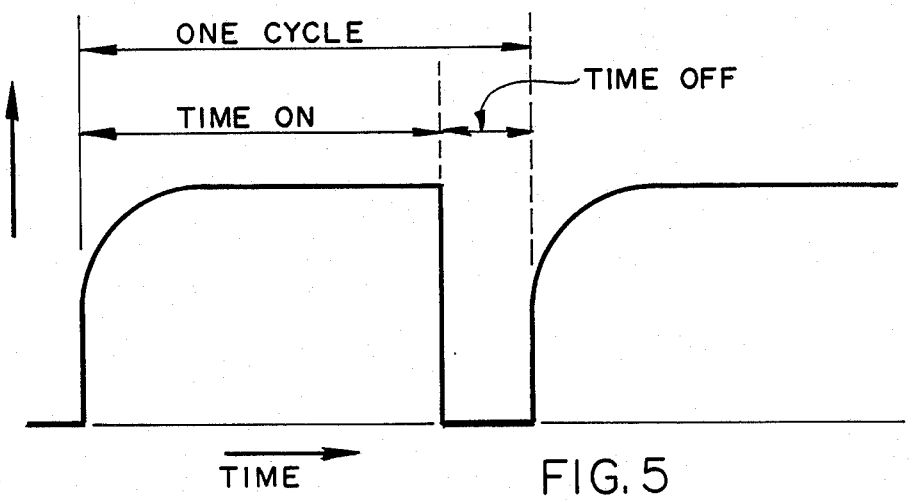

The electrical circuitry of the sonic fishing lure 10 is shown schematically in block fashion in FIG. 4 of the drawings. An electrical source comprising batteries 20 are connected to a first astable multivibrator 47 the output of which is connected to a second astable multivibrator 48 whose output in turn is connected to sonic transducer 30. Astable multivibrator 47 outputs a signal of approximately one (1) Hertz while a second astable multivibrator 48 outputs a signal of approximately one hundred (100) Hertz. The output signal of vibrator 48 and, therefore, the output signal of sonic transducer 30 are pulsed as shown in FIG. 5 of the drawings. It has been determined that intermittently pulsed outputs at approximately one hundred (100) Hertz which lasts for a duration of approximately 700 milliseconds and separated by a non-sound producing time of approximately 200 millisecond has been more effective to attract fish as compared to a continuous signal. The pulsed sonic output is, of course, constantly repeated while the inventive fishing lure is being used within a body of water to attract and catch fish. The pulsed sound output by the inventive fishing lure 10 is able to be distinguished by fish over the ever present normal background noise within bodies of water. Furthermore, the pulsed output tends to simulate sounds output by a fish in distress which also outputs an intermittent sound. In this manner the inventive fishing lure appears to be a fish in distress to the fish within the vicinity of the sonic fishing lure 10.

In accordance with the features provided by the inventive sonic fishing lure 10 to efficiently maximize the sound output by the sonic fishing lure 10, a highly effective fishing lure is presented. A fluidic coupling of chamber 34 in combination with the vibrating mass of the improved sonic transducer 30 together output a relatively intense sound which travels over relatively large distances.

While the invention has been described, disclosed, illustrated and shown in certain terms or certain embodiments or modifications which is has assumed in practice, the scope of the invention is not intended to be nor should it be deemed to be limited thereby and such other modifications or embodiments as may be suggested by the teachings herein are particularly reserved especially as they fall within the breadth and scope of the claims here appended

We claim as our invention:

1. A fishing lure adapted to be used in water comprising
   a body,
   an electrical power source within said body,
   electronic means connected to said power source for producing an electric signal having a frequency range between 50 to 300 hertz and having wave characteristics which enhance the attraction of fish,
   a transducer connected to said electronic means for converting said electrical signal into sound, comprising a housing, an electrical coil, a first disk, a second disk connected to said first disk by a rod therebetween, said coil being located within said housing whereby an electrical signal furnished to said coil causes said connected disks to vibrate and produce said sound having said frequency range, and,
   means for transmitting said sound produced by said transducer into said water.

2. The apparatus of claim 1, wherein said means for transmitting said sound produced by said transducer into said water comprises a fluidic coupling between said transducer and said body of the fishing lure.

3. The apparatus of claim 2, wherein said fluidic coupling comprises a hollow sealed chamber within said fishing lure body within which said transducer is located, and a fluid within said hollow chamber coupling said transducer to said fishing lure body.

4. The apparatus of claim 1, wherein said wave characteristics of said electronic means comprises continuous cycles each of which outputs a signal for a length of time followed by another length of time where no signal is output.

5. The apparatus of claim 4, wherein said continuous cycles each comprise an output signal for approximately 700 milliseconds and no output signal for approximately 200 milliseconds.

6. The apparatus of claim 1, wherein said sonic transducer is located within a hollow sealed chamber within the body of said fishing lure, and a fluid within said hollow chamber whereby the sound produced by said transducer is fluid coupled to said fishing lure body and then transmitted through said fishing lure body to said water within which said lure is adapted to be used.

7. A fishing lure adapted to be used in water comprising
   a body,
   an electrical power source within said body,
   electronic means connected to said power source for producing an electrical signal having a frequency range between 50 and 300 hertz and having wave characteristics which enhance the attraction of fish,
   transducer means connected to said electronic means for converting said electrical signal into sound, and,
   means for transmitting said sound produced by said transducer into said water comprising a fluidic coupling between said transducer and said body of the fishing lure, said fluidic coupling comprising a hollow, sealed chamber within said fishing lure body within which said transducer is located and a fluid within said hollow, sealed chamber coupling said transducer to said fishing lure body.

* * * * *